United States Patent [19]
Hayashi

[11] Patent Number: 5,284,043
[45] Date of Patent: Feb. 8, 1994

[54] METHOD AND DEVICE FOR SEPARATING A CONTOURED PRODUCT FROM SHEET METAL

[75] Inventor: Tetsuji Hayashi, La Mirada, Calif.

[73] Assignee: Amada Manufacturing America Inc., La Mirada, Calif.

[21] Appl. No.: 953,086

[22] Filed: Sep. 29, 1992

[51] Int. Cl.⁵ .................................................. B21D 28/10
[52] U.S. Cl. ........................................ 72/330; 72/325; 72/339; 83/51; 83/862; 225/2
[58] Field of Search ................................ 72/324–326, 72/330, 339; 83/51, 32, 39, 862; 225/2

[56] References Cited

U.S. PATENT DOCUMENTS

| | | | |
|---|---|---|---|
| 2,508,758 | 5/1950 | Hollerith | 83/51 |
| 3,169,684 | 2/1965 | Purski | 225/2 |
| 3,357,078 | 12/1967 | Moltchan | 72/325 |
| 3,717,022 | 2/1973 | Du Bois | 72/325 |
| 4,109,500 | 8/1978 | Franer | 83/51 |
| 4,282,996 | 8/1981 | Maeda | 225/2 |
| 4,477,537 | 10/1984 | Blase | 83/51 |
| 4,546,683 | 10/1985 | Volkel | 83/157 |
| 4,561,579 | 12/1985 | Fleming | 83/51 |

FOREIGN PATENT DOCUMENTS

| | | | |
|---|---|---|---|
| 2301774 | 7/1974 | Fed. Rep. of Germany | 83/51 |
| 217012 | 10/1985 | Japan | 83/51 |

Primary Examiner—Daniel C. Crane
Attorney, Agent, or Firm—Wigman, Cohen, Leitner & Meyers

[57] ABSTRACT

A method for cutting and separating from a piece of sheet metal a product, comprising a first step for contouring the product while leaving a small joint such as a connecting web or micro-joint which connects the product to the sheet metal, a second step for forming a protrusion on or adjacent to the small joint by lancing, embossing, or semi-shearing, and a third step for pressing the protrusion in order to shear the small joint.

12 Claims, 9 Drawing Sheets

METHOD AND DEVICE FOR SEPARATING A CONTOURED PRODUCT FROM SHEET METAL

BACKGROUND OF THE INVENTION

1. Field of the Invention

This invention relates to a method and a device for separating from sheet metal a product which is connected to the sheet metal through a small joint such as a connecting web or micro-joint, and to a die tool used in a punch press for separating a product from sheet metal.

2. Description of the Prior Art

Conventionally, when one or more than two products are contoured in a piece of sheet metal and separated from the sheet metal, the contoured products are generally not cut off from the sheet metal, but connected to the sheet metal through one or more than two connecting webs or micro-joints.

When the products are connected to the sheet metal through connecting webs, subsequent cutting to cut the webs by a cutting machine is necessary to separate the product from the sheet metal. When the products are cut off from the sheet metal, they are positioned in turn in a cutting zone of the cutting machine. The positioning of the product or the sheet metal with precision in the cutting zone, however, becomes difficult when some products are cut off, since the sheet metal loses its strength and deforms because of openings thereby caused.

When the products are connected to the sheet metal through micro-joints, subsequent mechanical or manual hammering or vibrating must be carried out with respect to the sheet metal. In this case, damages such as cuts, bents, and depressions may be caused on the products.

In any case of the above-mentioned connecting web joints or micro-joints, separating from the sheet metal the products makes much noise.

SUMMARY OF THE INVENTION

The present invention is made in view of the above-mentioned problems. It is a first object of the present invention to provide a method for separating from a piece of sheet metal a product so contoured as to leave a small joint such as a connecting web or micro-joint which connects the product to the sheet metal, without giving an impulse or vibration on the sheet metal and without making much noise.

It is a second object of the present invention to provide a device for separating from a piece of sheet metal a product so contoured as to leave a small joint which connects the product to the sheet metal, without giving an impulse or vibration on the sheet metal and without making much noise.

It is a third object of the present invention to provide a pair of tool assemblies attachable to a punch press and to be used by the above method. The dies cooperate with each other to knock out a connecting web by lancing and make a tab joint.

The method of the present invention, for separating from a piece of sheet metal a product, includes a first step for contouring the product while leaving a small joint of a connecting web or micro-joint which connects the product to the sheet metal, a second step for forming a protrusion on or near the small joint by lancing, embossing, or semi-shearing, and a third step for pressing the protrusion in order to shear the small joint.

An embodiment of the above separating method is configured as the method for separating from the sheet metal the product, wherein the first step is contouring the product while leaving the connecting web, and the second step is lancing the connecting web thereby forming a tab joint only which connects the product to the sheet metal.

Another embodiment of the above separating method is configured as the method for separating from the sheet metal the product, wherein the first step is contouring the product while leaving the connecting web, and the second step is semi-shearing the connecting web thereby forming the protruding or unevenness along the connecting web.

A further embodiment of the above separating method is configured as the method for separating from the sheet metal the product, wherein the first step is contouring the product while leaving the micro-joint, and the second step is forming the protrusion on the sheet metal near the micro-joint. The protrusion is formed by lancing or embossing.

An embodiment of the device of the present invention, for separating a contoured product connected to a piece of sheet metal through a small joint on or near which a protrusion is formed, includes a press device for pressing the protrusion to shear the small joint. The press device of the separating device may be a pinch roller.

An embodiment of the device of the present invention, for separating from a piece of sheet metal a product, is configured as a punch press system including means for contouring the product in the sheet metal while leaving a small joint which connects the product to the sheet metal, a pair of punch and die tolls for forming a protrusion on or near the small joint, and press means for pressing the protrusion adapted to shear the small joint.

The pair of punch and die tools of the present invention are attachable to a punch press so that the tools face each other, each tool having a blade formed as an inclined surface for lancing a connecting web which connects a contoured product to a piece of sheet metal, wherein the blade of one of the tools is therein formed with a notch adapted to form a tab joint on the connecting web when the connecting web is lanced.

According to the method and device of the present invention, the protrusion or unevenness is formed on the small joint portion, i.e., on the connecting web, or on a portion of the metal sheet near the micro-joint, through which the contoured product is connected to the sheet metal, and pressed by the press device to shear the small joint, so that the contoured product is separated from the sheet metal without causing damages on the products and without causing much noise.

DESCRIPTION OF THE PREFERRED EMBODIMENTS

The present invention is now explained in detail through embodiments with reference to the accompany drawings.

Figure 1:
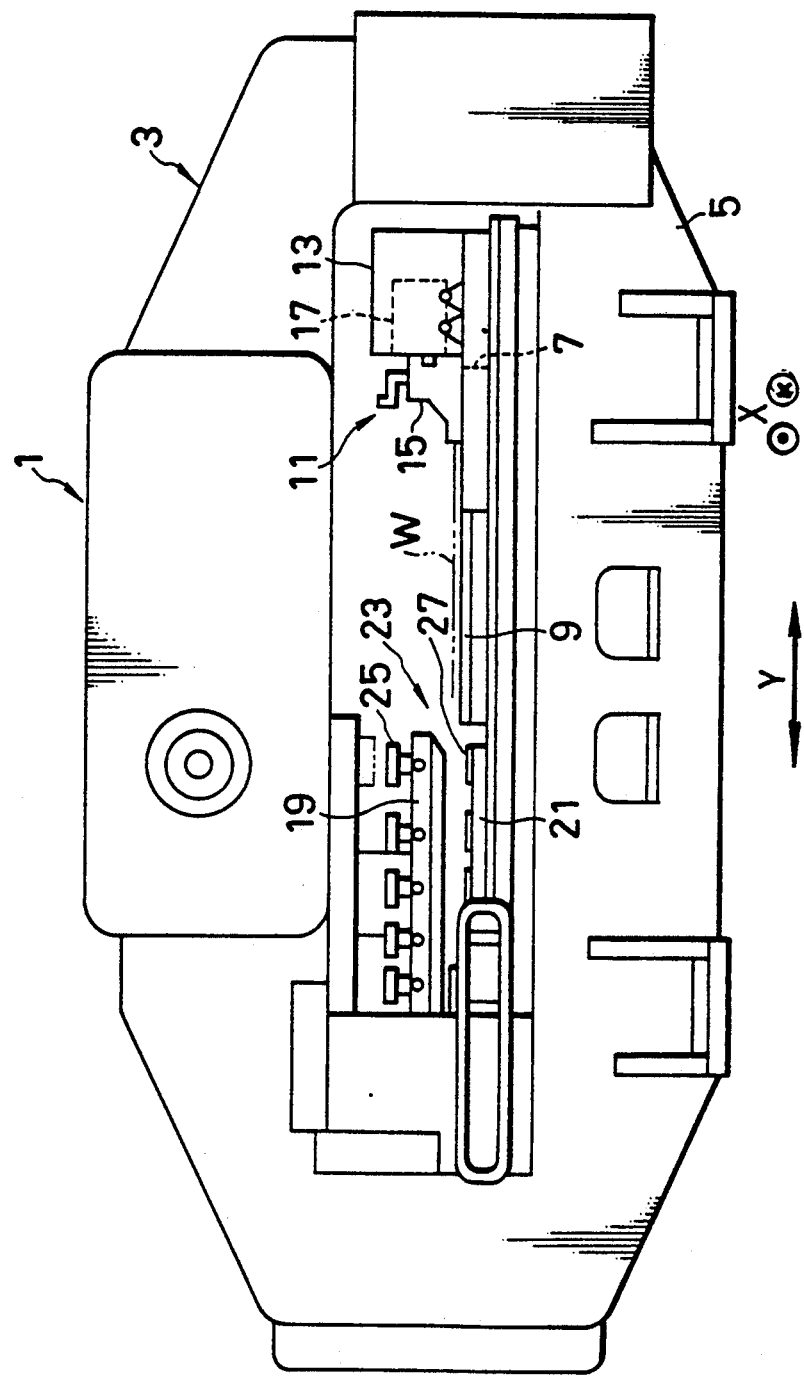
FIG. 1 is a side view of a turret punch press for processing or punching a piece of sheet metal according to the present invention.

In FIG. 1, a punch press or turret punch press 1 is provided with a bridge-shaped frame body 3 including a lower frame 5. The lower frame 5 supports an immovable table 7 and a pair of movable tables 9 disposed at both sides (the front and the back of the sheet of the drawing) of the immovable table 7. The immovable and movable tables 7 and 9 support a piece of sheet metal W during processing of the sheet metal. The movable tables 9 move forward and backward (to the left and right in FIG. 1).

The press 1 is provided with a work positioning device 11 for positioning the sheet metal or work W supported by the tables 7 and 9 in forward and backward and rightward and leftward directions. A carriage base 13, which is a member of the work positioning device 11, is mounted on the movable tables 9. A clamping device 15 for clamping the sheet metal W is attached to a carriage 17 which is mounted on the carriage base 13 so as to move to the right and left in the direction perpendicular to the drawing sheet.

The press 1 is provided with an upper turret 19 and a lower turret 21 at the front of the immovable table 7. The upper and lower turrets 19 and 21 face each other and constitute a processing portion 23 of the press 1. The upper turret 19 carries a number of punch devices 25, while the lower turret 21 carries a number of die devices 27.

In the above configuration of the punch press 1, the clamping device 15 clamps an end portion of the sheet metal W which is put on the immovable and movable tables 7 and 9. The sheet metal W is then positioned as desired between the upper and lower turrets 19 and 21 by moving forwardly or backwardly (in the direction Y) the movable tables 9 on which the carriage base 13 is mounted and rightwardly and leftwardly (in the direction X) the carriage 17. Then, punching is carried out as desired with respect to the sheet metal W by the processing portion 23 of the punch press.

Figure 2:
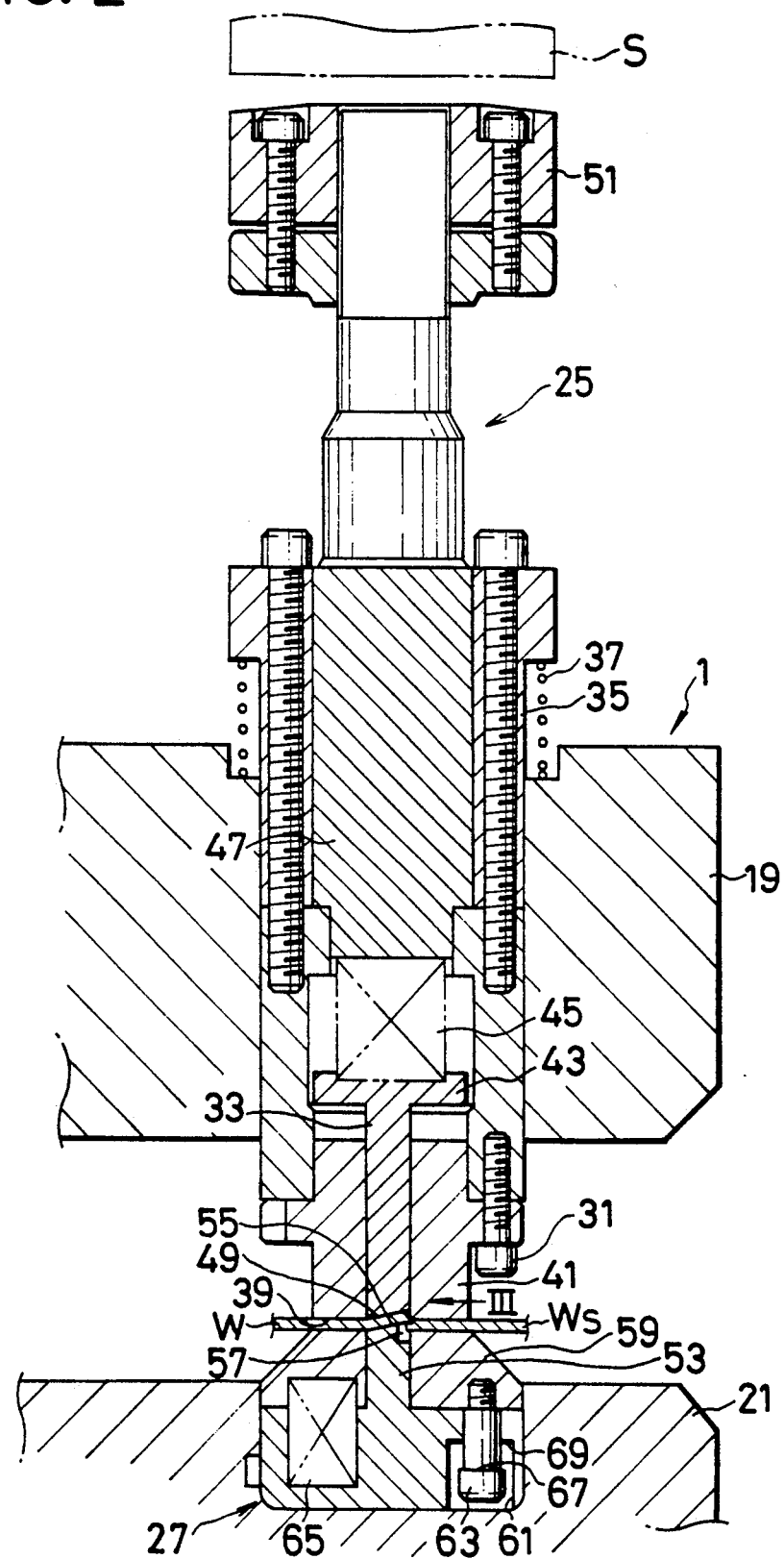
FIG. 2 is a sectional view showing a punch and a die tools of the punch press of FIG. 1.

FIG. 2 shows the punch device 25 and the die device 27 respectively mounted on the upper and the lower turrets 19 and 21 which are indexed at a punching position of the press 1. At the punching position, a vertically movable striker S of the press is disposed above the punch device 25.

The punch device 25 includes a punch tool 33, punch guide 35, and other members described hereinafter. The punch guide 35 is supported in the upper turret 19 by a soft spring 37 so that the guide 35 can vertically slide. A holding block 41 is secured to the bottom of the punch guide 35 by bolts 31. The soft spring normally raises the holding block 41 above the sheet metal W, so that a bottom surface 39 of the block 41 is above the sheet metal W. The punch tool 33 is vertically movable in the holding block 41. A plate-shaped top portion 43 of the punch tool 33 receives a lower end of a spring 45. The other end of the spring 45 is connected to a punch body 47 disposed in an upper portion of the punch guide 35. The punch body 47 is provided with a punch head 51 which is pressed by the striker S. A blade 49 of the punch tool 33 is formed as an inclined surface as shown in FIGS. 2 and 3.

Figure 3:
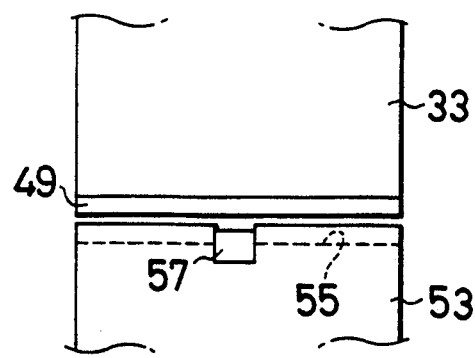
FIG. 3 is an enlarged side view indicated by arrow III of FIG. 2, showing blades of the punch and die tools of the tool portion.

The die device 27 includes a die tool 53 with an inclined top surface forming a die blade 55 as shown in FIGS. 2 and 3. The inclined top surface 55 of the die tool 53 is parallel to the punch blade 49. A notch 57 is formed in the central part of the blade 55 of the die tool 53. The functions of the notch 57 is described later. An ejector 59 is secured on the die tool 53 by one or more than two stopper bolts 63 which can vertically slide in recesses 61 formed in the bottom of the die tool 53. One or more than two springs 65 are provided between the ejector 59 and the die tool 53. The springs 65 normally raise the ejector 59 above the die tool 53 until heads 67 of the stopper bolts 63 come into contact with upper surfaces 69 defined by the die tool 53 and the recesses 61.

With reference to FIGS. 4-9 as well as FIGS. 1-3, now cutting and separating a product Wp (FIG. 4) from a piece of sheet metal W is explained.

Figure 4:
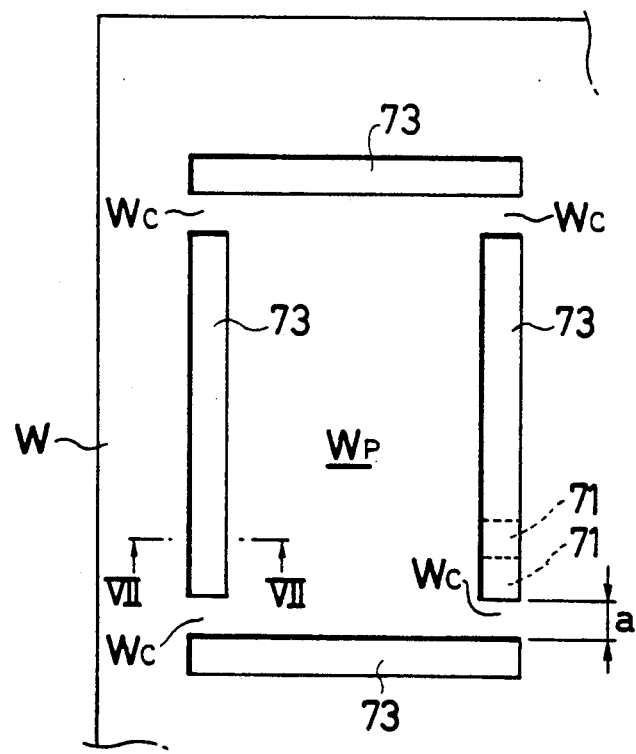
FIG. 4 is a plan view showing a product contoured and connected to a piece of sheet metal through connecting webs.

The first step of processing of the sheet metal W is contouring the product Wp in the sheet metal W. The sheet metal W is clamped and positioned by the positioning device 11 (FIG. 1) between the punch device 25 and the die device 27 of the punch press 1. As shown in FIG. 4, small parts 71 of the sheet metal W are continuously punched in turn by nibbling by the press 1 and four elongate portions 73 are cut while leaving four connecting webs Wc between the elongate portions 73. Thus, the product Wp is contoured and is still connected to the sheet metal W through the connecting webs Wc. The width "a" of the connecting web Wc is generally determined in view of the thickness of the sheet metal and the size of the product. In the first step of processing, known punch and die tool assemblies suitable for nibbling are used. The tool assemblies are not shown in the drawings since this kind of tool assemblies are well known in the prior art, and therefore a further description is omitted.

The second step of processing is, as shown in FIGS. 5-9, is lancing the connecting web Wc and separating almost all part of the connecting web Wc from the product Wp while forming a protruding tab joint Pt in the connecting web Wc so that the product Wp is connected to the sheet metal W only through the protruding tab joint Pt. After the first step, all the connecting webs Wc shown in FIG. 4 are positioned in turn between the punch tool 33 and the die tool 53 as shown in FIG. 2. After it, the striker S press the punch body 47, so that the holding block 41 presses the sheet metal W against the ejector 59 and then the punch tool 33 presses the connecting web Wc against the die tool 53. The width "b" (FIG. 5) of the blades 49, 55 of the tools 33, 53 are equal to, or preferably greater than the width "a" of the connecting web Wc. A detailed description of the functions of the springs 37 and 45, punch guide 35, and ejector 59 are omitted since they are known matters.

Figure 6:
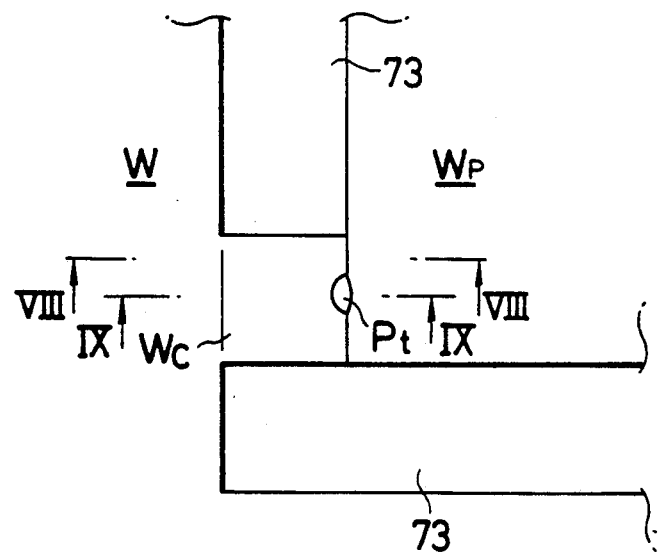
FIG. 6 is an enlarged detail of the connecting web shown by arrow VI of FIG. 5.
Figure 7:
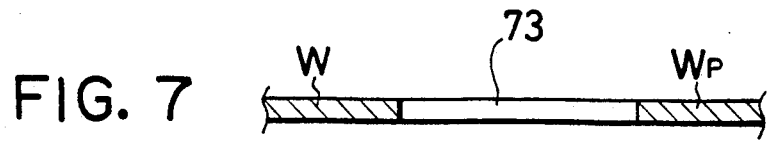
FIG. 7 is a sectional view along line VII—VII of FIG. 4.
Figure 8:
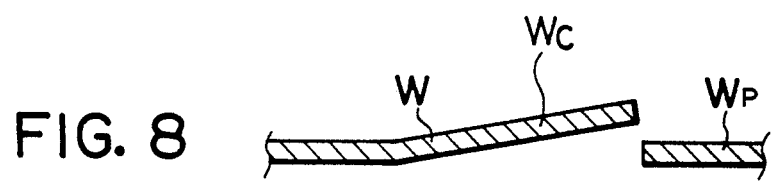
FIG. 8 is a sectional view along line VIII—VIII of FIG. 4.
Figure 9:
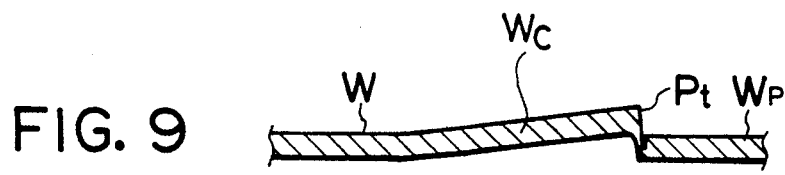
FIG. 9 is a sectional view along line IX—IX of FIG. 6, showing the protrusion formed as a tab joint which connects the product to the sheet metal.

As a result of the cooperation of the punch and die tools 33, 53, the connecting web Wc is lanced and separated from the product Wp as shown in FIGS. 6 and 8, however a tab joint Pt protruding from the sheet metal W is formed in the connecting web Wc because of the presence of the notch 57 in the die blade 55. The product Wp is still connected to the sheet metal W only through the protruding tab joint Pt as shown in FIG. 9. Thus, the tab joint or protrusion Pt is formed on the connecting web portion Wc.

The third step of processing the sheet metal W is to separate the product Wp from the sheet metal W. This third step is explained later in detail.

Figure 5:
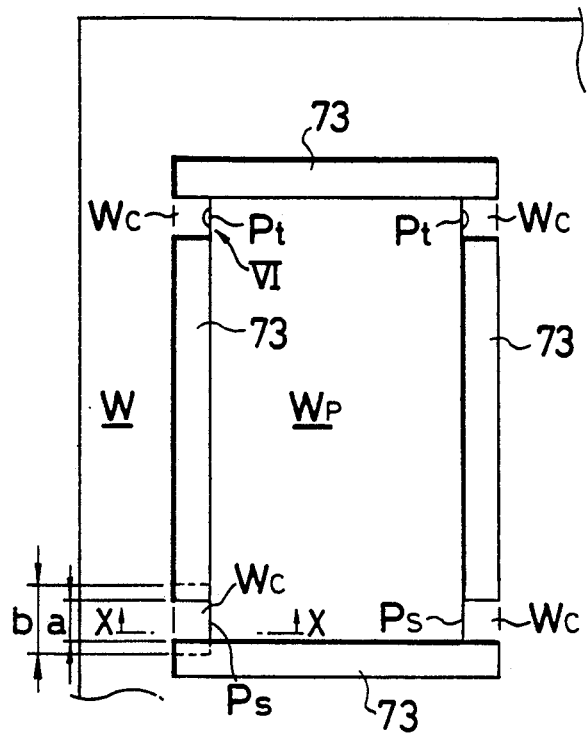
FIG. 5 is a plan view showing protrusions or unevennesses formed by lancing or semi-shearing on the connecting webs of FIG. 4.
Figure 10:
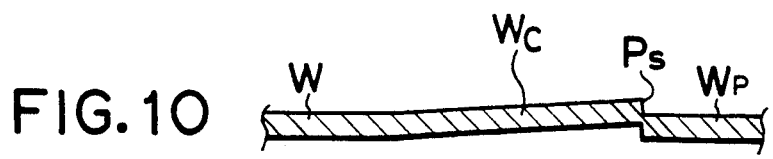
FIG. 10 is a sectional view along line X—X of FIG. 5, showing the protrusion or unevenness formed along the connecting web by semi-shearing.
Figure 11:
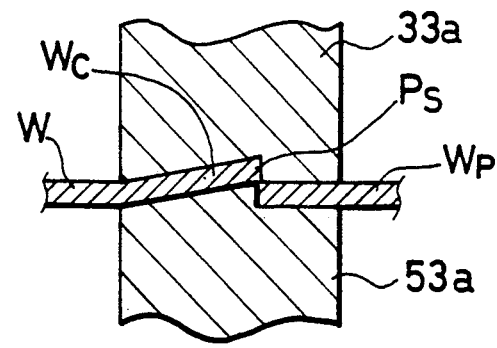
FIG. 11 is a sectional view showing a pair of punch and die tools for semi-shearing.

With reference to FIGS. 5, 10, and 11, an alternative way to form a protrusion Ps on the connecting web Wc shown in FIG. 4, is explained.

The product Wp is connected to the sheet metal W through a plurality of the connecting webs Wc as shown in the lower part of the FIG. 5. FIG. 10 shows a sectional view of the connecting web Wc on which the protrusion or unevenness Ps is formed by semi-shearing by the press 1 of FIG. 1. For carrying out the semi-shearing, a pair of punch and die tools 33a, 53a shown in FIG. 11 are used, and the stroke of the striker S is adequately controlled. Each of the tools 33a, 53a is so suitably and conventionally designed as to carry out a semi-shear of the connecting web Wc. Thus, the protrusion or unevenness Ps is formed along or over the full width "a" of the connecting web Wc.

With reference to FIGS. 12-16, a second embodiment corresponding to the above explained steps 1 and 2 of processing the metal sheet W is described.

Figure 12:
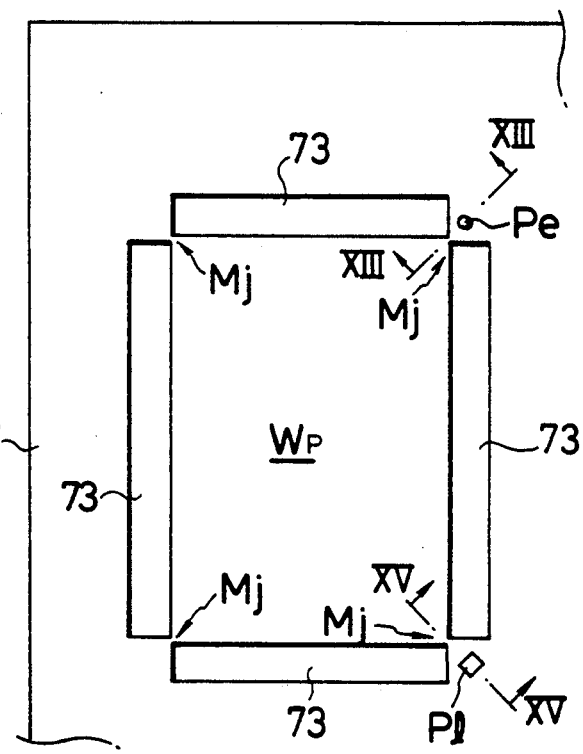
FIG. 12 is a plan view showing a product contoured and connected to a piece of sheet metal through micro-joints.

FIG. 12 shows a product Wp connected to a piece of sheet metal W through a plurality of micro-joints Mj. As a first step in this second embodiment, the product Wp is contoured by cutting surrounding portions 73 in the same manner as described in the first embodiment, while, however, leaving a plurality of, what is called, "micro-joints" between the cut surrounding portions 73. The product Wp is connected to the sheet metal W through the micro-joints Mj.

Figure 13:
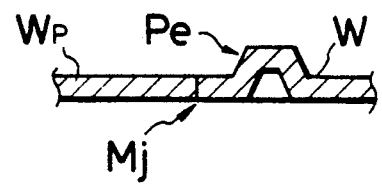
FIG. 13 is a sectional view along line XIII—XIII of FIG. 12, showing a protrusion or emboss formed on the sheet metal adjacent to the micro-joint.
Figure 15:
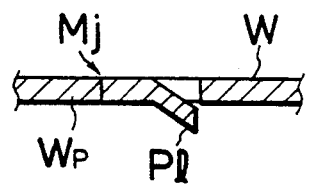
FIG. 15 is a sectional view along line XV—XV of FIG. 12, showing a protrusion or lance formed on the sheet metal adjacent to the micro-joint.

A second step in the second embodiment is to form a protrusion Pe or Pl on the sheet metal W adjacent to each micro-joint Mj as shown in FIGS. 12 and 13 or 15 by embossing or lancing.

Figure 14:
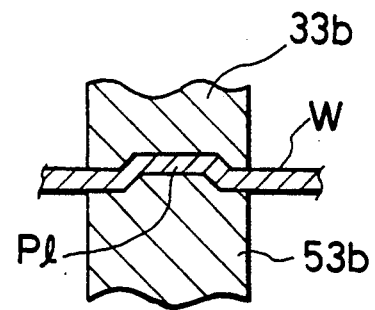
FIG. 14 is a sectional view showing a pair of punch and die tools for embossing.

For carrying out the embossing, a pair of punch and die tools, 33b, 53b shown in FIG. 14 are used. The tools 33b, 53b are so suitably and conventionally designed as to execute embossing of the sheet metal W. Thus, the protrusion or emboss Pe is formed on the sheet metal W adjacent to the micro-joint Mj as shown in FIGS. 12 and 13.

Figure 16:
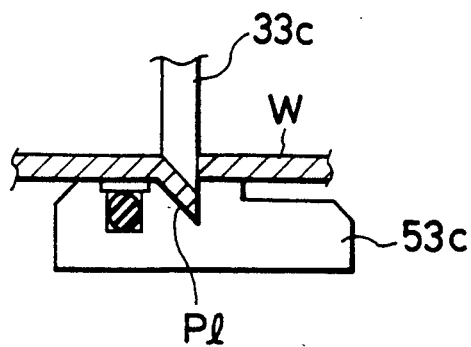
FIG. 16 is a side view partially in section, showing a pair of punch and die tools for lancing.

For carrying out the lancing, a pair of punch and die tools 33c, 53c shown in FIG. 16 are used. The tools 33c, 53c are so suitably and conventionally designed as to execute lancing of the sheet metal W. Thus, the protrusion or lance Pe is formed on the sheet metal W adjacent to the micro-joint Mj as shown in FIGS. 12 and 15.

Figure 17:
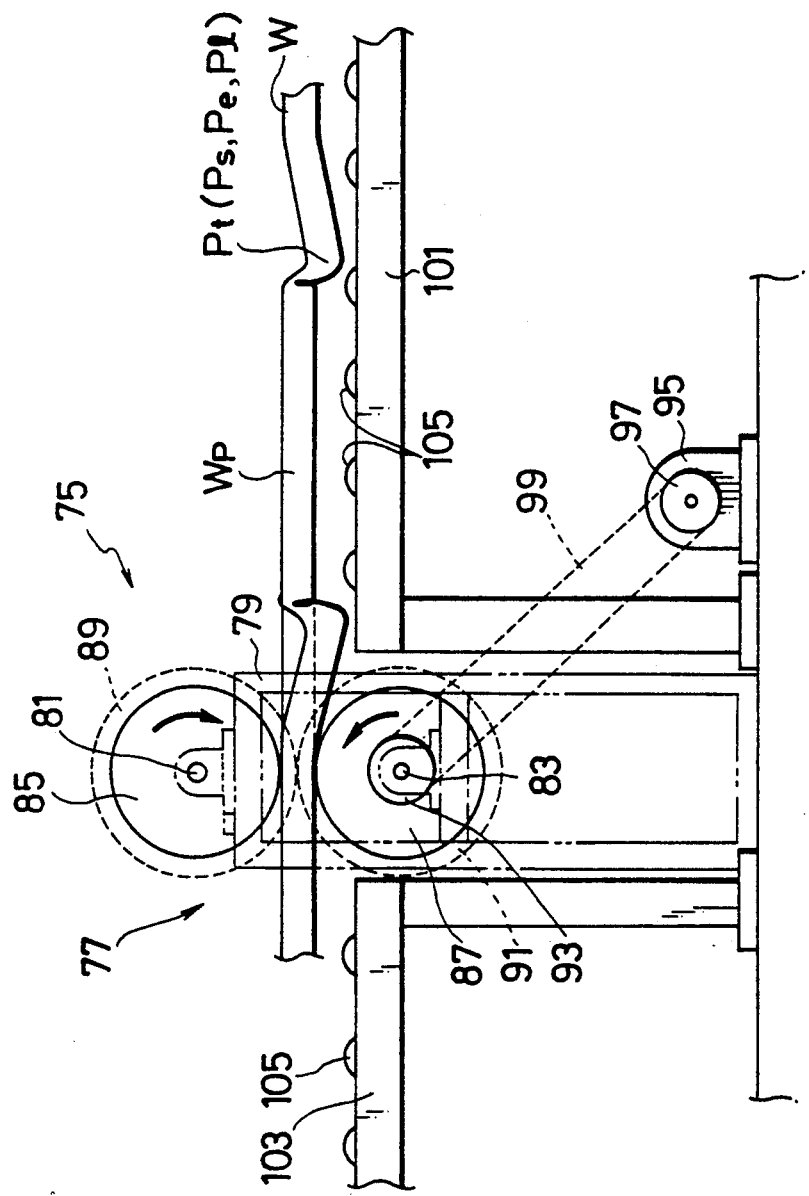
FIG. 17 is a side view of a product separating device of the present invention.
Figure 18:
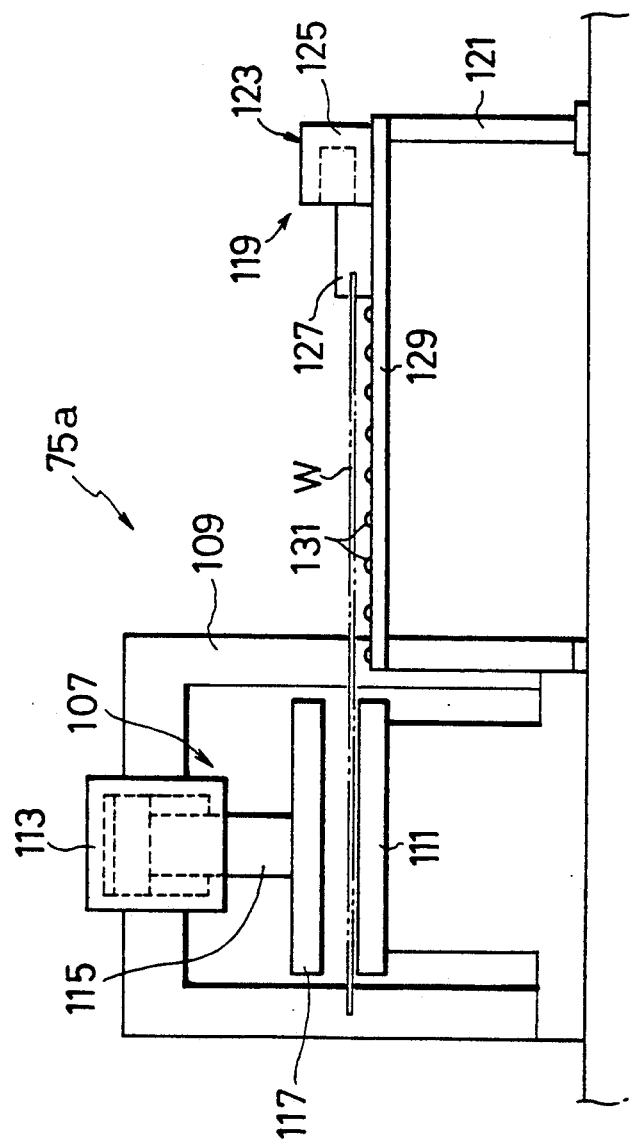
FIG. 18 is a front view of another product separating device of the present invention.

With reference to FIGS. 17 and 18, now the third step of processing the metal sheet is explained. The third step is separating from the sheet metal W the product Wp connected to the sheet metal W through the protruding tab joints Pt, or semi-sheared joints formed in the connecting webs Wc, or micro-joints Mj with the adjacent protrusions Pe or Pl.

FIG. 17 shows a device 75 for separating from the sheet metal W the product Wp. The separating device 75 is provided with a roll device 77 mounted on a frame 79 installed on the floor. The roll device 77 is comprised of an upper and a lower pinch rollers 85 and 87 rotatably mounted on the frame 79 through bearings 81 and 83 respectively. A gear 89 is attached around the upper pinch roller 85 while a gear 91 is attached around the lower pinch roller 87 so that the gears 89 and 91 engage each other. A pair of sprockets 93 are attached to both ends of the lower pinch roller 87. A motor 95 with a pair of drive sprockets 97 for rotating the sprockets 93 of the lower pinch roller 87 is provided. A pair of transmission belts 99 such as timing belts are expanded between the sprockets 93 and the drive sprockets 97.

In this configuration, when the motor 95 is driven to rotate the lower pinch roller 87 in the counterclockwise direction the upper pinch roller 85 rotates in the clockwise direction as shown by arrows in FIG. 17.

At the front and rear of the frame 79, a front table 101 and a rear table 103 are disposed. A number of free bearings 105 are embedded in the top surfaces of the tables 101 and 103.

By using the above described separating device 75, the product Wp is separated from the metal sheet W. The metal sheet W to which one or more than two products Wp are connected through the small joints with protrusions Pt, Ps, Pe or Pl are moved on the front table 101 and passed through between the pinch rollers 85 and 87. As a result, the protrusions Pt, Ps, Pe or Pl are pressed and the small joints formed in the connecting webs Wc, or micro-joints are severed. Therefore, the products Wp and the remaining part of the sheet metal W are discharged onto the rear table 103.

FIG. 18 shows another separating device 75a for separating from the sheet metal W the products Wp. The separating device 75a is provided with a press device 107 mounted on a frame 109 installed on the floor.

A bench table 111 is disposed under the press device 107. The press device 107 includes hydraulic ram cylinder 113 secured to an upper part of the frame 109, and a piston rod 115 to a free end of which a rigid press plate 117 is attached. At the front of the bench table 111, a work carrying device 119 is disposed. The work carrying device 119 is installed on a bed 121. A slider 123 of the work carrying device 119 is movable on the bed 121 in the forward and backward direction, that is, toward and away from the bench table 111. A carriage 125 for moving transversely is attached to the slider 123. The carriage 125 has one or a plurality of clampers 127 for clamping the sheet metal W. A plurality of free bearings 131 for supporting the sheet metal W are provided in the top member 129 of the bed 121.

When the work carrying device 119 operates to position a desired part of the sheet metal W or the product Wp on the bench table 111, the ram cylinder is activated to cause the press plate 117 to descend and press the protrusions Pt, Ps, Pe, or Pl of the product parts Wp against the bench table 111. As a result, the small joints are severed without damaging the products and without making much noise, similarly in the separating device of FIG. 17.

I claim:

1. A method of separating a product from a piece of sheet metal, comprising the steps of:
    contouring the product while leaving a small joint of a connecting web which connects the product to the sheet metal; forming a protrusion on or near the small joint, wherein the product is connected to the sheet metal through the connecting web, forming a tab joint on the connecting web by lancing the connecting web so that the product is connected to the sheet metal only through the tab joint; and
    pressing the protrusion in order to shear the small joint.

2. A method of separating a product from a work sheet by cutting the work sheet along a line, the method comprising the steps of:
    punching the work sheet along the line except a portion where a joint connecting said product to said work sheet is formed;
    providing a protrusion on or near said joint; and
    pressing said protrusion in order to cut said joint and separate said product from said work sheet at said joint.

3. The method according to claim 2, further comprising a step of cutting side parts of said joint along the line except a center part which is to form a tab joint.

4. The method according to claim 3, wherein said step of providing said protrusion and said step of cutting the side parts are carried out simultaneously.

5. The method according to claim 2, wherein said protrusion is provided by forming a semi-shearing portion on said joint.

6. The method according to claim 2, wherein said joint includes a micro-joint, and said protrusion is formed adjacent to said micro-joint on said work sheet.

7. The method according to claim 6, wherein the protrusion is formed by lancing the work sheet.

8. The method according to claim 6, wherein the protrusion is formed by embossing the work sheet.

9. A punch press system for separating a product from a work sheet by cutting the work sheet along a line, the system comprising:
    means for punching the work sheet along the line except a portion where a joint connecting said product to said work sheet is formed;
    means for providing a protrusion on or near said joint; and
    means for pressing said protrusion in order to cut said joint and separate said product from said work sheet at said joint.

10. The punch press system according to claim 9, wherein said means for pressing includes a pair of pinch rollers between which said work sheet is pressed and said product is severed from said work sheet.

11. The punch press system according to claim 1, wherein said means for pressing includes a press plate and a bench table between which said work sheet is pressed and said product is severed from said work sheet.

12. The punch press system according to claim 11, wherein an area of an operation surface of said press plate and said bench table is larger than an area of said product.

* * * * *

UNITED STATES PATENT AND TRADEMARK OFFICE
CERTIFICATE OF CORRECTION

PATENT NO. : 5,284,043
DATED : February 8, 1994
INVENTOR(S) : Tetsuji Hayashi

It is certified that error appears in the above-indentified patent and that said Letters Patent is hereby corrected as shown below:

IN THE TITLE PAGE:

Correct the name of the assignee as follows:

[73]  Assignee:    Amada Mfg America Inc., La Mirada, Calif.

Signed and Sealed this

Twenty-fifth Day of November, 1997

*Attest:*

BRUCE LEHMAN

*Attesting Officer*          Commissioner of Patents and Trademarks